US012221906B2

United States Patent
Song et al.

(10) Patent No.: US 12,221,906 B2
(45) Date of Patent: Feb. 11, 2025

(54) SYSTEM AND METHOD FOR REALIZING TRANSFORMATION OF THERMAL POWER UNIT BASED ON COMBINED HIGH-PARAMETER AND LOW-PARAMETER MOLTEN SALTS

(71) Applicant: Xi'an Thermal Power Research Institute Co., Ltd, Xi'an (CN)

(72) Inventors: Xiaohui Song, Xi'an (CN); Wei Han, Xi'an (CN); Kangli Fu, Xi'an (CN); Xu Lu, Xi'an (CN); Haimin Ji, Xi'an (CN); Mingyu Yao, Xi'an (CN); Zaisong Yu, Xi'an (CN); Liang Zhao, Xi'an (CN)

(73) Assignee: Xi'an Thermal Power Research Institute Co., L, Xi'an Shaanxi (CN)

( * ) Notice: Subject to any disclaimer, the term of this patent is extended or adjusted under 35 U.S.C. 154(b) by 56 days.

(21) Appl. No.: 18/350,306

(22) Filed: Jul. 11, 2023

(65) Prior Publication Data

US 2024/0035396 A1 Feb. 1, 2024

Related U.S. Application Data

(63) Continuation of application No. PCT/CN2022/102303, filed on Jun. 29, 2022.

(30) Foreign Application Priority Data

Mar. 21, 2022 (CN) .......................... 202210278915.3

(51) Int. Cl.
*F01K 3/18* (2006.01)
*F01K 3/12* (2006.01)
(Continued)

(52) U.S. Cl.
CPC .............. *F01K 3/186* (2013.01); *F01K 3/12* (2013.01); *F01K 3/18* (2013.01); *F01K 11/02* (2013.01); *F28D 2020/0047* (2013.01)

(58) Field of Classification Search
CPC ... F01K 3/12; F01K 3/18; F01K 3/186; F28D 2020/0047
See application file for complete search history.

(56) References Cited

U.S. PATENT DOCUMENTS

| 2022/0025779 A1* | 1/2022 | Rosenfeld | ............. F03G 7/0252 |
| 2022/0049653 A1* | 2/2022 | Bollinger | .................. F02C 6/14 |

FOREIGN PATENT DOCUMENTS

| CN | 106885232 A | 6/2017 |
| CN | 108316980 A | 7/2018 |

(Continued)

OTHER PUBLICATIONS

International Search Report corresponding to PCT Application No. PCT/CN2022/102303, (Chinese language document) (11 pages).

*Primary Examiner* — Jonathan R Matthias
(74) *Attorney, Agent, or Firm* — Maginot, Moore & Beck, LLP

(57) ABSTRACT

A system for realizing transformation of a thermal power unit based on combined high-parameter and low-parameter molten salts includes a high-parameter molten salt energy storage system, a low-parameter molten salt energy storage system and a thermal power unit. The high-parameter molten salt energy storage system and the low-parameter molten salt energy storage system include an electric heater for heating a molten salt, and an electric energy input end of the electric heater is connected with an electric energy output end of the thermal power unit. The low-parameter molten salt energy storage system includes a low-parameter molten salt heat absorption loop and a low-parameter molten salt heat release loop, and the high-parameter molten salt energy (Continued)

storage system includes a high-parameter molten salt heat absorption loop and a high-parameter molten salt heat release loop.

7 Claims, 1 Drawing Sheet

(51) Int. Cl.
*F01K 11/02* (2006.01)
*F28D 20/00* (2006.01)

(56) References Cited

FOREIGN PATENT DOCUMENTS

| | | |
|---|---|---|
| CN | 110006026 A | 7/2019 |
| CN | 111140296 A | 5/2020 |
| CN | 114592934 A | 6/2022 |
| JP | 2017-125460 A | 7/2017 |
| WO | 2021/257731 A1 | 12/2021 |

* cited by examiner

SYSTEM AND METHOD FOR REALIZING TRANSFORMATION OF THERMAL POWER UNIT BASED ON COMBINED HIGH-PARAMETER AND LOW-PARAMETER MOLTEN SALTS

CROSS REFERENCE TO RELATED APPLICATIONS

The present application is a continuation of International Application No. PCT/CN2022/102303, filed on Jun. 29, 2022, which claims the benefit of and priority to Chinese Application No. 202210278915.3, filed on Mar. 21, 2022, the entire disclosures of which are incorporated herein by reference.

FIELD

The present disclosure relates to a field of molten salt energy storage, and more particularly to a system and a method for realizing transformation of a thermal power unit based on combined high-parameter and low-parameter molten salts.

BACKGROUND

The flexible transformation of the thermal power unit is the general trend of the power supply transformation under the carbon peaking and carbon neutrality goals, and it is also the urgent task. It is one of the mature solutions to use the molten salt energy storage technology to realize the thermoelectric decoupling, thermal energy/electric energy storage and delayed reuse, so as to improve the flexibility of the unit. The molten salt heat storage and heat supply can solve the deep frequency modulation and peak shaving of the thermal power unit with the ultra-low load, and its application scope includes the low-cost and high-parameter thermoelectric decoupling and peak shaving heat supply project with large-scale energy storage requirements and the typical scene of the pure condensing unit with large-capacity peak shaving requirements. Among many molten salt choices, the binary nitrate is maturely and widely used, but it is difficult to match with the unit with high parameters of 565° C. and more due to the limit of the highest temperature; the carbonate has a high melting point, but its use temperature range is harsh (397° C.-650° C.); the molten salt in the chloride system has an excellent cost advantage and can match with the unit with the high parameters, but it has a high corrosivity.

The heat source of the molten salt heat storage system combined with the existing thermal power base mainly comes from the extraction of steam from the main steam pipeline, the extraction of steam from the reheat steam pipeline or the steam extraction by using the exhaust pipe of the medium-pressure cylinder; the steam after heat release is connected to the condenser, the deaerator or the auxiliary steam header according to different pressure levels. The solution of the steam extraction by using the exhaust pipe of the medium-pressure cylinder has little system change and a low overall project cost, but the energy storage efficiency of the system is lower than that of the solution of extracting the main reheat steam, and the hydrophobic temperature of the condenser is high, which affects the back pressure of the unit and reduces the capacity of the unit doing work; on the other hand, due to the extraction of a large amount of low-grade steam, it is necessary to use electric heating to raise the temperature again, and the electric heater consumes a large proportion of power, thus further reducing the overall efficiency of the system.

SUMMARY

Embodiments of a first aspect of the present disclosure provide a system for realizing transformation of a thermal power unit based on combined high-parameter and low-parameter molten salts. The system includes a high-parameter molten salt energy storage system, a low-parameter molten salt energy storage system and a thermal power unit. The high-parameter molten salt energy storage system includes an electric heater for heating a molten salt, and an electric energy input end of the electric heater is connected with an electric energy output end of the thermal power unit; the high-parameter molten salt energy storage system includes a high-parameter molten salt heat absorption loop and a high-parameter molten salt heat release loop; the low-parameter molten salt energy storage system includes a low-parameter molten salt heat absorption loop and a low-parameter molten salt heat release loop; the low-parameter molten salt heat absorption loop includes a first steam inlet and a first exothermic steam outlet, and the first steam inlet and the first exothermic steam outlet are connected with a hot reheat steam pipeline and a deaerator inlet of the thermal power unit, respectively; the high-parameter molten salt heat absorption loop includes a second steam inlet and a second exothermic steam outlet, the second steam inlet and the second exothermic steam outlet are connected with a main steam pipeline and a cold reheat pipeline of the thermal power unit, respectively, and a regulating valve is arranged between the cold reheat pipeline and the second exothermic steam outlet; the low-parameter molten salt heat release loop includes a feed water inlet and a steam outlet, and the feed water inlet is connected with a high-pressure outlet of the thermal power unit; the high-parameter molten salt heat release loop includes an endothermic steam inlet and an endothermic steam outlet, the endothermic steam inlet is connected with the steam outlet of the low-parameter molten salt energy storage system, and the endothermic steam outlet is connected with a steam inlet of an medium-pressure cylinder of the thermal power unit.

Embodiments of a second aspect of the present disclosure provide an operation method of the system according to the embodiments of the first aspect of the present disclosure, includes an energy storage process and an energy release process. In the energy storage process, a steam from a reheat steam pipeline of the thermal power unit enters the low-parameter molten salt heat absorption loop to release heat to heat a molten salt, heat is stored in a low-parameter molten salt, and the reheated steam enters a deaerator of the thermal power unit after releasing the heat; a part of a high-grade steam drawn out from the main steam pipeline of the thermal power unit enters a high-parameter molten salt heat absorption loop to release heat to heat a high-parameter molten salt, and the heated high-parameter molten salt further heats the high-parameter molten salt by using an electric energy of the thermal power unit to store heat in the high-parameter molten salt; in the energy release process, a feed water in the thermal power unit enters the low-parameter molten salt heat release loop to absorb heat and become a steam, and the steam enters the high-parameter molten salt heat release loop to further absorb heat and become a superheated steam, and the superheated steam enters the medium-pressure cylinder to do work through the reheat steam pipeline of the thermal power unit.

DETAILED DESCRIPTION

Figure 1:
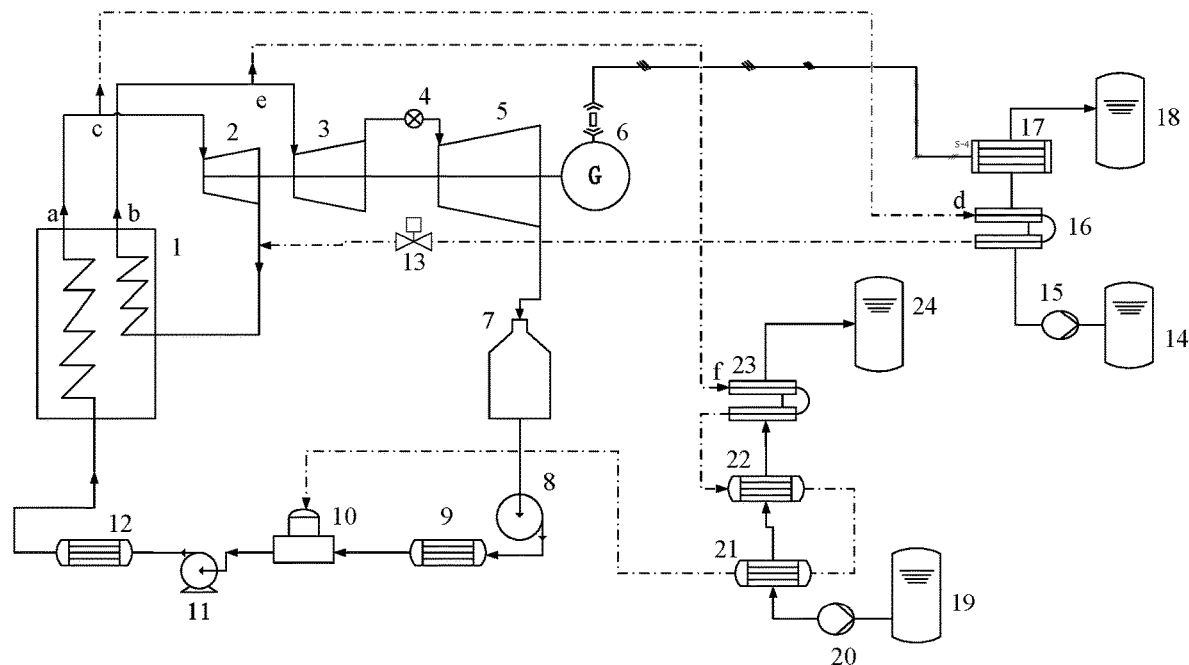
FIG. 1 is a schematic view showing an energy storage process of a system in an embodiment of the present disclosure.

The present disclosure will be further described in detail with reference to the accompanying drawings and embodiments. It can be understood that the specific embodiments described here are only used to explain the relevant contents, and not to limit the present disclosure. In addition, for the convenience of description, only the parts related to the present disclosure are shown in the drawings.

It should be noted that the embodiments in the present disclosure and the features in the embodiments can be combined with each other without conflict. Hereinafter, the technical solution of the present disclosure will be described in detail with reference to the accompanying drawings and in combination with the embodiments.

Unless otherwise specified, the illustrated exemplary embodiments/examples will be understood as exemplary features that provide various details of some ways in which the technical concept of the present disclosure can be implemented in practice. Therefore, unless otherwise specified, the features of various embodiments/examples can be additionally combined, separated, interchanged and/or rearranged without departing from the technical concept of the present disclosure.

When a component is referred to as "on" or "above", "connected to" or "coupled to" another component, the component may be directly on, directly connected to or directly coupled to the other component, or an intervening component may be present. However, when a component is referred to as "directly on", "directly connected to" or "directly coupled to" another component, there is no intervening component. For this purpose, the term "connect" may refer to a physical connection, an electrical connection, etc., with or without an intervening component.

In addition, the terms "first" and "second" are only used for the purpose of description, and cannot be understood as indicating or implying relative importance or implicitly indicating the number of indicated technical features. Therefore, the features defined as "first" and "second" can explicitly or implicitly include at least one of these features. In the description of the present disclosure, "a plurality" of means at least two, such as two, three, etc., unless otherwise specifically defined.

The present disclosure provides a system and a method for realizing transformation of a thermal power unit based on combined high-parameter and low-parameter molten salts, a low-temperature molten salt adopts a ternary nitrate and a high-temperature molten salt adopts a ternary carbonate. In an energy storage stage, steams are drawn out from a main steam pipeline and a hot reheat pipeline respectively, the main steam is returned to a cold reheat pipeline after releasing heat through salt-steam heat exchange, and the reheat steam is returned to a deaerator after releasing heat through salt-steam heat exchange, so that the peak shaving depth can be lowered to be below 10% of the rated load, and also, the configured molten salt electric heater has a high power load, which can realize a rapid frequency modulation of the unit. In an energy release stage, a high-pressure feed water is drawn out from the outlet of the high-pressure heater, and a high-grade steam is generated through cascade heat exchange, and finally returns to the hot reheat pipeline to enter the medium-pressure cylinder to do work, thus realizing the peak shaving of the unit.

Referring to FIG. 1, a process of a conventional thermal power unit is as follows: a steam from a superheater outlet A of a boiler 1 enters a high-pressure cylinder 2 to do work, the steam is discharged from the high-pressure cylinder to enters a boiler reheater, the steam from a reheater outlet B enters a medium-pressure cylinder 3 to do work, an exhaust control valve 4 is arranged between the medium-pressure cylinder exhaust and a low-pressure cylinder, and the low-pressure cylinder can operate at zero output by controlling the medium-pressure cylinder exhaust through the exhaust control valve 4. The steam entering the low-pressure cylinder 5 is discharged into a condenser 7 after doing work, and at the same time, it drives an electric generator 6 to generate electricity. The condensed water in the condenser 7 enters a deaerator 10 through a condensate pump 8 and a low-pressure heater 9, and after being reheated in the deaerator, it is pumped into a high-pressure heater 12 by a feed water pump 11, and finally enters the boiler 1 to finish a complete power cycle.

Referring to FIG. 1, the technical solution adopted by the present disclosure is to add a set of molten salt energy storage system to the process of the conventional thermal power unit, and the molten salt adopts a combination of a high-parameter carbonate and a low-melting-point nitrate. A superheater outlet of a boiler is denoted as a, a reheater outlet of the boiler is denoted as b, a main steam extraction port is denoted as c, a steam side inlet of a salt-steam heat exchanger is denoted as d, a hot reheat steam extraction port is denoted as e, and a steam side inlet of a high temperature heat exchanger is denoted as f. A high-parameter molten salt energy storage system, a low-parameter molten salt energy storage system and an existing thermal power unit are combined. The high-parameter molten salt energy storage system is provided with an electric heater for heating the molten salt, and an electric energy input end of the electric heater is connected with an electric energy output end of the existing thermal power unit. A high-parameter molten salt heat absorption loop and a high-parameter molten salt heat release loop are arranged in the high-parameter molten salt energy storage system. A low-parameter molten salt heat absorption loop and a low-parameter molten salt heat release loop are arranged in the low-parameter molten salt energy storage system. A first steam inlet and a first exothermic steam outlet are arranged in the low-parameter molten salt heat absorption loop, and the first steam inlet and the first exothermic steam outlet are respectively connected with a hot reheat steam pipeline and a deaerator inlet 10 of the existing thermal power unit. The high-parameter molten salt heat absorption loop is provided with a second steam inlet and a second exothermic steam outlet, the second steam inlet and the second exothermic steam outlet are respectively connected with a main steam pipeline and a cold reheat pipeline of the existing thermal power unit, and a regulating valve 13 is arranged between the cold reheat pipeline and the second exothermic steam outlet.

The low-parameter molten salt heat release loop is provided with a feed water inlet and a steam outlet, and the feed water inlet is connected with a high-pressure outlet of the existing thermal power unit. An endothermic steam inlet and an endothermic steam outlet are arranged in the high-parameter molten salt heat release loop, the endothermic steam inlet is connected with the steam outlet of the low-parameter molten salt energy storage system, and the endothermic steam outlet is connected with a steam inlet of a medium-pressure cylinder of the existing thermal power unit.

Figure 2:
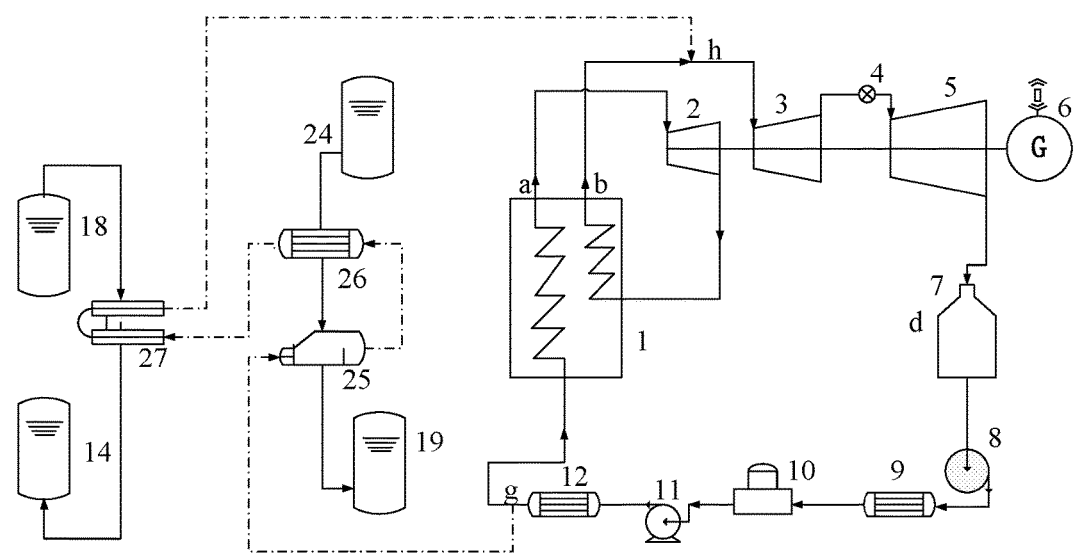
FIG. 2 is a schematic view showing an energy release process of a system in an embodiment of the present disclosure.

Referring to FIG. 1 and FIG. 2, the present disclosure provides a system for realizing transformation of a thermal power unit based on combined high-parameter and low-parameter molten salts, which includes an existing thermal power unit and a molten salt energy storage system. The molten salt energy storage system includes a low-parameter low-temperature salt tank 19, a low-parameter high-temperature salt tank 24, a high-parameter low-temperature salt tank 14 and a high-parameter high-temperature salt tank 18, the low-parameter low-temperature salt tank 19 and the low-parameter high-temperature salt tank 24 are in communication with each other, and a low-parameter molten salt heat absorption loop and a low-parameter molten salt heat release loop are arranged between the two. A heat exchanger group is arranged in the low-parameter molten salt heat absorption loop, a hot-side inlet of the heat exchanger group is connected with a hot reheat steam pipeline, and a cold-side outlet of the heat exchanger group is connected with a deaerator. A low-parameter low-temperature molten salt is output by a low-temperature molten salt pump 20, and passes through a low-temperature heat exchanger 21, a medium-temperature heat exchanger 22 and a high-temperature heat exchanger 23 in sequence for cascade heat absorption and then enters a low-parameter high-temperature salt tank 24 to complete the heat absorption process.

A molten salt steam generator 26 and a molten salt preheater 25 are sequentially arranged in the low-parameter molten salt heat release loop along a flow direction of an exothermic medium, a cold-side inlet of the molten salt preheater 25 is connected with an outlet of a high-pressure heater 12, a cold-side outlet of the molten salt preheater 25 is connected with a cold-side inlet of the molten salt steam generator 26, and a cold-side outlet of the molten salt steam generator 26 is connected to the high-parameter heat release loop, so that the feed water continues to enter the molten salt steam generator 26 to absorb heat to generate the steam after absorbing heat in the molten salt preheater 25, and the low-parameter high-temperature molten salt flows from the low-parameter high-temperature salt tank 24 through the hot side of the molten salt generator 26, flows to the hot side of the molten salt preheater 25, and then enters the low-parameter low-temperature salt tank 19. The high-parameter low-temperature salt tank 14 and the high-parameter high-temperature salt tank 18 are in communication with each other. A high-parameter molten salt heat absorption loop and a high-parameter molten salt heat release loop are arranged between the high-parameter low-temperature salt tank 14 and the high-parameter high-temperature salt tank 18. A salt-steam heat exchanger 16 and an electric heater 17 are arranged in the high-parameter molten salt heat release loop. A molten salt superheater 27 is arranged in the high-parameter molten salt heat release loop. A cold-side inlet of the molten salt superheater 27 is connected with the outlet of the molten salt steam generator 26, a cold-side outlet of the molten salt superheater 27 is connected with the hot reheat steam pipeline from the boiler 1 to the medium-pressure cylinder 3, and a hot-side inlet and a hot-side outlet of the molten salt superheater 27 are respectively connected with an outlet of the high-parameter high-temperature salt tank 18 and an inlet of the high-parameter low-temperature salt tank 14. The high-parameter high-temperature molten salt enters the molten salt superheater 27 to release heat and then enters the high-parameter low-temperature salt tank 14, and the steam absorbs heat in the molten salt superheater 27 and then becomes the superheated steam to enter the medium-pressure cylinder 3 to do work.

The specific process of the energy storage stage at the molten salt side is as follows: the salt from the low-parameter low-temperature salt tank 19 passes through the low-temperature molten salt pump 20, the low-temperature heat exchanger 21, the medium-temperature heat exchanger 22 and the high-temperature heat exchanger 23 in sequence, and enters the low-parameter high-temperature salt tank 24, and the salt from the high-parameter low-temperature salt tank 14 passes through a high-temperature molten salt pump 15, the salt-steam heat exchanger 16 and the electric heater 17, and enters the high-parameter high-temperature salt tank 18.

The extracted steam in the energy storage stage comes from the main steam pipeline and the reheat steam pipeline, respectively. The steam extracted from the reheat steam pipeline enters the deaerator 10 for recovery after exchanging heat with the low-parameter molten salt. The steam extracted from the main steam pipeline enters the cold reheat pipeline through the regulating valve 13 after exchanging heat with the high-parameter molten salt in the salt-gas heat exchanger 16, and the regulating valve 13 can adapt the pressure entering the cold reheat pipeline according to the different loads of the unit.

In the energy release stage, the feed water from the outlet of the high-pressure heater 12 passes through the molten salt preheater 25 and the molten salt steam generator 26 in sequence to exchange heat with the high-parameter high-temperature molten salt, and then enters the molten salt superheater 27, and the heated high-temperature and high-pressure steam joins the hot reheat steam at an interface h and enters the medium-pressure cylinder 3 to do work.

The outlets of the high-parameter low-temperature salt tank 14 and the low-parameter low-temperature salt tank 19 are provided with the high-temperature molten salt pump 15 and the low-temperature molten salt pump 20, respectively.

A power supply of the electric heater 17 comes from an outlet line of the electric generator 6, and the power requirements of different levels of voltages, such as 380V, 690V, 6000V or 10000V, can be realized by voltage conversion, and the rapid frequency modulation of some electric loads can be realized by using auxiliary power.

Taking operating parameters in an operating condition of a 670 MW supercritical unit at a deep peak-shaving load point of 40% THA as an example, and in this case, the power is 276 MW, the heat consumption is 8195.4 kJ/kW·h, the steam consumption is 2.681 kg/kW·h, the main feed water temperature is 222.1° C., the main reheat temperature is 566° C., the main steam pressure is 24.2 MPa, and the reheat steam pressure is 1.597 MPa, the temperature of the cold reheat section is 325° C., the pressure of the cold reheat section is 1.77 MPa, and the exhaust temperature of the medium-pressure cylinder is 374.6° C.

The specific embodiment will be described with reference to the parameters in the following process.

In the steam extraction and heat storage process, a high-grade steam of 566° C. and 24.2 MPa is extracted from the main steam of the existing thermal power unit to enter the salt-steam heat exchanger of the high-parameter molten salt system, and the steam after heat exchange enters the cold reheat pipeline with parameters of 1.74 MPa and 218° C.; a high-temperature steam of 566° C. and 1.74 MPa is extracted from the hot reheat pipeline of the existing thermal power unit to enter the low-parameter molten salt system, and enters the deaerator after exchanging heat with the low-parameter molten salt heat exchanger group; a low-parameter low-temperature molten salt of 260° C. is heated in the heat exchanger group in sequence, then its temperature is raised to 550° C. and it enters the low-parameter high-temperature salt tank; and a high-parameter low-temperature molten salt of 400° C. is heated in the salt-steam heat exchanger and enters the electric heater to raise its temperature again, finally its temperature is raised to 630° C., and it enters the high-parameter high-temperature salt tank. The electric heater 17 is connected to the outlet line of the electric generator 6.

In the energy release process, a feed water of 230° C. is drawn out from the outlet of the high-pressure heater of the existing thermal power unit to enter the molten salt preheater 25 to be heated, and then enters the molten salt steam generator 26 to absorb heat to become the steam; a low-parameter high-temperature molten salt of 550° C. enters the molten salt steam generator 26 and the molten salt preheater 25 from the low-parameter high-temperature salt tank 24 to reduce the temperature to 260° C., and then enters the low-parameter low-temperature salt tank 19, the steam enters the molten salt superheater 27 to absorb heat and become a superheated steam of 566° C., the superheated steam enters the medium-pressure cylinder 3 to do work from the outlet of the molten salt superheater 27 through the h port of the reheat steam pipeline, and the high-parameter high-temperature molten salt enters the hot side of the molten salt superheater 27 from the high-parameter high-temperature salt tank 18 to release heat, then the temperature drops to 400° C. and it enters the high-parameter low-temperature salt tank 14. Based on the above steam extraction and heat storage process and the energy release process, the specific operating parameters of the existing thermal Dower unit are as follows:

| | energy storage | energy release |
|---|---|---|
| temperature of feed water ° C. | 207.1 | 230.6 |
| temperature of main steam ° C. | 566 | 566 |
| pressure of main steam MPa | 24.2 | 24.2 |
| temperature of reheat steam ° C. | 566 | 566 |
| pressure of reheat steam MPa | 1.747 | 2.272 |
| temperature of cold reheat section ° C. | 218.9 | 288.9 |
| pressure of cold reheat section MPa | 1.747 | 2.272 |
| electric energy production kW | 98569 | 326043 |
| electric heating power kW | 38555 | 0 |
| High-parameter molten salt heat exchanger power kW | 49738 | / |
| high-parameter and low-parameter molten salt heat exchanger power kW | 50721 | / |
| molten salt heat exchanger overall power kW | 100459 | 155056 |
| heat storage time h | 6 | 5.34 |
| high temperature salt quantity MWh | 298 | / |
| low melting point salt MWh | 304 | / |
| heat storage capacity MWh | 834 | 834 |
| total electricity generation power in energy storage stage MWh | 360 | 1753 |
| total energy storage efficiency % | 65.2 | |

Compared with the related art, the present disclosure has at least the following beneficial effects:

1) the whole system of the present disclosure is simple and the whole process of the present disclosure is reasonable;
2) the main equipment has a small amount of modification, and after modification, it has the peak shaving ability of less than 10%;
3) the segmental independent heat exchanges are used, the heat loss in the heat exchange process of the high-grade heat source is reduced, and the parameter matching of various segments of heat exchange is ensured;
4) the combination of the high-parameter molten salt and the low-melting salt is adopted, which on one hand solves the risk that the single low-temperature salt may operate with extreme parameters and decompose at the high temperature, and on the other hand solves the problem that only the high-parameter salt is used to operate at the lower limit of the parameter with a low cost performance;
5) the extracted main reheat steam has high parameters, and can better match with the high-parameter molten salt, which reduces the power consumption proportion occupied the high-power electric heater, and further improves the overall energy storage efficiency of the system.

Finally, it should be noted that the disclosed embodiments are intended to help further understand the present disclosure, but those skilled in the art can understand that various substitutions and modifications are possible without departing from the spirit and scope of the present disclosure and the appended claims. Therefore, the present disclosure should not be limited to what is disclosed in the embodiments, and the scope of the present disclosure is subject to the scope defined in the claims.

The invention claimed is:

1. A system for realizing transformation of a thermal power unit based on combined high-parameter and low-parameter molten salts, comprising a high-parameter molten salt energy storage system, a low-parameter molten salt energy storage system and a thermal power unit, wherein the high-parameter molten salt energy storage system comprises an electric heater for heating a molten salt, and an electric energy input end of the electric heater is connected with an electric energy output end of the thermal power unit;

the high-parameter molten salt energy storage system comprises a high-parameter molten salt heat absorption loop and a high-parameter molten salt heat release loop, and the low-parameter molten salt energy storage system comprises a low-parameter molten salt heat absorption loop and a low-parameter molten salt heat release loop;

the low-parameter molten salt heat absorption loop comprises a first steam inlet and a first exothermic steam outlet, and the first steam inlet and the first exothermic steam outlet are connected with a hot reheat steam pipeline and an inlet of a deaerator of the thermal power unit, respectively; the high-parameter molten salt heat absorption loop comprises a second steam inlet and a second exothermic steam outlet, the second steam inlet and the second exothermic steam outlet are connected with a main steam pipeline and a cold reheat pipeline of the thermal power unit, respectively; and a regulating valve is arranged between the cold reheat pipeline and the second exothermic steam outlet;

the low-parameter molten salt heat release loop comprises a feed water inlet and a steam outlet, and the feed water inlet is connected with a high-pressure outlet of the thermal power unit; the high-parameter molten salt heat release loop comprises an endothermic steam inlet and an endothermic steam outlet, the endothermic steam inlet is connected with the steam outlet of the low-parameter molten salt energy storage system, and the endothermic steam outlet is connected with a steam inlet of a medium-pressure cylinder of the thermal power unit, wherein the high-parameter molten salt energy storage system comprises a high-parameter low-temperature salt tank and a high-parameter high-temperature salt tank, and the low-parameter molten salt energy storage system comprises a low-parameter low-temperature salt tank and a low-parameter high-temperature salt tank;

the low-parameter low-temperature salt tank and the low-parameter high-temperature salt tank are in communication with each other, the low-parameter molten salt heat absorption loop and the low-parameter molten salt heat release loop are arranged between the low-parameter low-temperature salt tank and the low-parameter high-temperature salt tank, the high-parameter low-temperature salt tank and the high-parameter high-temperature salt tank are in communication with each other, and the high-parameter molten salt heat absorption loop and the high-parameter molten salt heat release loop are arranged between the high-parameter low-temperature salt tank and the high-parameter high-temperature salt tank;

the high-parameter molten salt heat absorption loop comprises an electric heater and a salt-steam heat exchanger;

an electric energy input end of the electric heater is connected with an electric energy output end of an electric generator in the thermal power unit, a hot-side inlet and a hot-side outlet of the salt-steam heat exchanger are connected with the main steam pipeline and the cold reheat pipeline of the thermal power unit, respectively, a cold-side inlet and a cold-side outlet of the salt-steam heat exchanger are connected with the high-parameter low-temperature salt tank and the electric heater, respectively, and the electric heater is connected with the high-parameter high-temperature salt tank;

the low-parameter molten salt heat absorption loop comprises a high-temperature heat exchanger, a medium-temperature heat exchanger and a low-temperature heat exchanger connected in sequence along a flow direction of the steam, and an exhaust side of the low-temperature heat exchanger is connected to the deaerator of the thermal power unit;

the high-parameter molten salt heat release loop comprises a molten salt superheater, the low-parameter molten salt heat release loop comprises a heat exchanger group, an inlet of the heat exchanger group is connected with the high-pressure outlet of the thermal power unit, an outlet of the heat exchanger group is connected with an inlet of the molten salt superheater, and an outlet of the molten salt superheater is connected with a reheat steam pipeline of the thermal power unit;

a cold-side inlet and a cold-side outlet of the heat exchanger group are connected with the low-parameter low-temperature salt tank and the low-parameter high-temperature salt tank, respectively.

2. The system for realizing transformation of the thermal power unit based on combined high-parameter and low-parameter molten salts according to claim 1, wherein the heat exchanger group comprises a molten salt preheater and a molten salt steam generator connected in series, a cold-side inlet of the molten salt preheater is connected with an outlet of a high-pressure heater of the thermal power unit, a cold-side outlet of the molten salt preheater is connected with a cold-side inlet of the molten salt steam generator, and a cold-side outlet of the molten salt steam generator is connected with the inlet of the molten salt superheater.

3. The system for realizing transformation of the thermal power unit based on combined high-parameter and low-parameter molten salts according to claim 1, further comprising a high-temperature molten salt pump and a low-temperature molten salt pump arranged at outlets of the high-parameter low-temperature salt tank and the low-parameter low-temperature salt tank, respectively.

4. The system for realizing transformation of the thermal power unit based on combined high-parameter and low-parameter molten salts according to claim 1, further comprising a transformer arranged at an outlet line of the thermal power unit and configured to output a voltage of at least one of 380V, 690V, 6000V or 10000V.

5. The system for realizing transformation of the thermal power unit based on combined high-parameter and low-parameter molten salts according to claim 1, wherein the low-parameter molten salt energy storage system uses a ternary nitrate, a low-parameter low-temperature molten salt has a temperature of 166° C., a low-parameter high-temperature molten salt has a temperature of 450° C., the high-parameter molten salt energy storage system uses a ternary carbonate, a high-parameter low-temperature molten salt has a temperature of 450° C., and a high-parameter high-temperature molten salt has a temperature of 600° C.

6. An operation method of a system according to claim 1, comprising an energy storage process and an energy release process, wherein, in the energy storage process, a steam from a reheat steam pipeline of the thermal power unit enters the low-parameter molten salt heat absorption loop to release heat to heat a low-parameter molten salt, heat is stored in the low-parameter molten salt, and the steam enters the deaerator of the thermal power unit after releasing the heat; a part of a high-grade steam drawn out from the main steam pipeline of the thermal power unit enters a high-parameter molten salt heat absorption loop to release heat to heat a high-parameter molten salt, and the heated high-parameter molten salt is further heated by using an electric energy of the thermal power unit to store heat in the high-parameter molten salt; and in the energy release process, a feed water in the thermal power unit enters the low-parameter molten salt heat release loop to absorb heat and become a steam, and the steam enters the high-parameter molten salt heat release loop to further absorb heat and become a superheated steam, and the superheated steam enters the medium-pressure cylinder to do work through the reheat steam pipeline of the thermal power unit.

7. The operation method according to claim 6, wherein in the energy storage progress, a low-parameter low-temperature molten salt from a low-parameter low-temperature salt tank enters a low-temperature heat exchanger, a medium-temperature heat exchanger and a high-temperature heat exchanger in sequence to absorb heat, and enters a low-parameter high-temperature salt tank to store heat after absorbing heat; a high-temperature steam from the main steam pipeline enters the cold reheat pipeline for recovery after releasing heat in the salt-steam heat exchanger; a high-parameter low-temperature molten salt from the high-parameter low-temperature salt tank firstly absorbs heat from the high-temperature steam in the salt-steam heat exchanger, then enters an electric heater to be heated into a high-parameter high-temperature molten salt, and then the high-parameter high-temperature molten salt enters a high-parameter high-temperature salt tank to store heat; and in the energy release process, the feed water from the high-pressure outlet of the thermal power unit is heated by a molten salt preheater and then enters a molten salt steam generator to absorb heat of a low-parameter high-temperature molten salt to become a steam, the steam enters a molten salt superheater, absorbs heat from the high-parameter high-temperature molten salt to become the superheated steam, and then the superheated steam enters the medium-pressure cylinder to do work, wherein the high-parameter high-temperature molten salt and the low-parameter high-temperature molten salt enter the high-parameter low-temperature salt tank and the low-parameter low-temperature salt tank after releasing heat, respectively.

* * * * *